(12) United States Patent
Yamazaki

(10) Patent No.: US 8,124,266 B2
(45) Date of Patent: Feb. 28, 2012

(54) ELECTRIC STORAGE DEVICE

(75) Inventor: Takeshi Yamazaki, Shibuya-ku (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 533 days.

(21) Appl. No.: 12/307,034

(22) PCT Filed: May 21, 2007

(86) PCT No.: PCT/JP2007/060749
§ 371 (c)(1),
(2), (4) Date: Dec. 30, 2008

(87) PCT Pub. No.: WO2008/010349
PCT Pub. Date: Jan. 24, 2008

(65) Prior Publication Data
US 2009/0311584 A1   Dec. 17, 2009

(30) Foreign Application Priority Data

Jul. 19, 2006   (JP) ................................. 2006-196939
Apr. 12, 2007   (JP) ................................. 2007-104963

(51) Int. Cl.
*H01M 10/50* (2006.01)
(52) U.S. Cl. ............................. 429/120; 429/90; 429/62
(58) Field of Classification Search .................... 429/120
See application file for complete search history.

(56) References Cited

U.S. PATENT DOCUMENTS
2005/0233204 A1 * 10/2005 Yata et al. ...................... 429/61

FOREIGN PATENT DOCUMENTS

| | | |
|---|---|---|
| EP | 1 083 618 A1 | 3/2001 |
| JP | 08-007926 A | 1/1996 |
| JP | 10-055825 A | 2/1998 |
| JP | 2000-243370 A | 9/2000 |
| JP | 2002-075455 A | 3/2002 |
| JP | 2004-253155 A | 9/2004 |
| JP | 2004-355953 A | 12/2004 |
| JP | 2005-235428 A | 9/2005 |

OTHER PUBLICATIONS

Liu, J., et al.: "Effect of methanol concentration on passive DMFC performance", Fuel Cells Bulletin, Elsevier Advanced Technology, Kidlington, GB, LNKD-DOI:10.1016/S1464-2859(05)00521-3, vol. 2005, No. 2, Feb. 1, 2005, pp. 12-17, ISSN: 1464-2859.

* cited by examiner

*Primary Examiner* — Barbara Gilliam
*Assistant Examiner* — Gary Harris
(74) *Attorney, Agent, or Firm* — Kenyon & Kenyon LLP

(57) ABSTRACT

An electric storage device is provided with a battery cell, a collector foil having a first metal plate and a second metal plate laminated together, and a voltmeter for measuring potential difference between the first metal plate and the second metal plate. The first metal plate and the second metal plate are formed of mutually different metals. The collector foil is arranged to be in contact with the battery cell.

6 Claims, 3 Drawing Sheets

ELECTRIC STORAGE DEVICE

This is a 371 national phase application of PCT/JP2007/060749 filed May 21, 2007, claiming priority to Japanese Patent Application No. 2006-196939 filed Jul. 19, 2006, and No. 2007-104963 filed Apr. 12, 2007, respectively, the contents of which are incorporated herein by reference.

TECHNICAL FIELD

The present invention relates to an electric storage device storing electricity.

BACKGROUND ART

In an electric storage device such as a secondary battery, heat generated by electrochemical reaction of storage cells arranged therein may build up, possibly increasing temperature. Power generation efficiency of the electric storage device possibly degrades when the device is heated to a high temperature. Therefore, temperature regulation is desirable.

Japanese Patent Laying-Open No. 2000-243370 discloses an assembled battery in which through holes are formed in partition walls of each battery cell in a battery case for electrically connecting electrodes of adjacent battery cells, and a heat conductive member formed of a material having superior electric conductivity and thermal conductivity is provided in the through holes. In the assembled battery, the heat-conducting member is sandwiched between two collector plate connectors that are in contact with cathode collector plate and anode collector plate. The heat-conducting member is formed to have a portion protrude outside the assembled battery, and a thermistor or the like is attached to the protruded portion, allowing detection of the temperature in the assembled battery.

Japanese Patent Laying-Open No. 10-55825 discloses a non-aqueous electrolytic secondary battery including a stacked electrode body having cathode and anode stacked with a separator inserted therebetween and a thermocouple wrapped therein. Opposite ends of the thermocouple are connected to a terminal for measuring internal temperature arranged on a surface of battery body. Voltage is measured by connecting a control circuit to the terminal for measuring internal temperature, and when the measurement goes out of a preset appropriate voltage range, charge/discharge is suppressed. According to the disclosure, the non-aqueous electrolytic secondary battery maximizes battery performance while attaining higher safety.

Japanese Patent Laying-Open No. 2004-253155 discloses a bipolar lithium ion secondary battery having a plurality of bipolar electrodes with cathode formed on one surface and anode formed on the other surface of a collector stacked in series, in which a portion of a periphery of the electrode is not insulated and the collector is exposed.

Japanese Patent Laying-Open No. 8-7926 discloses a non-aqueous electrolytic secondary battery comprised of a cathode using lithium compound as cathode active material, an anode using carbonaceous material in which lithium can be doped/undoped as an anode active material, and a non-aqueous electrolyte, in which a bipolar type electrode having cathode active material and anode active material held on opposite sides of one collector is used.

References described above disclose measurement of battery temperature by inserting a heat-conducting member in a battery case and by measuring the temperature of heat conducting member, or measurement of battery temperature by inserting a thermocouple to the central portion of a wound stacked body. In these batteries, however, the structures for measuring the battery temperature are complicated.

DISCLOSURE OF THE INVENTION

An object of the present invention is to provide an electric storage device allowing detection of any abnormality with a simple structure.

The present invention provides an electric storage, including an electric storage cell and a laminated metal plate having first and second metal plates laminated together. Potential difference measuring means for measuring potential difference between the first metal plate and the second metal plate is provided. The first metal plate and the second metal plate are formed of mutually different metals. The laminated metal plate is arranged to be in contact with the electric storage cell.

In the invention above, preferably, a collector plate arranged to be in plane-contact with the electric storage cell is provided, and the collector plate includes the laminated metal plate.

In the invention above, preferably, a stacked body including a stack of a plurality of electric storage cells are provided.

In the invention above, preferably, the potential difference measuring means includes leads connected to an end portion of the first metal plate and an end portion of the second metal plate, respectively, and a voltmeter connected to the leads for measuring the potential difference.

In the invention above, preferably, the electric storage cell includes a battery cell.

In the invention above, preferably, temperature detecting means for detecting temperature based on the potential difference is provided.

BEST MODES FOR CARRYING OUT THE INVENTION

Embodiment 1

Referring to FIGS. 1 to 4, the electric storage device in accordance with Embodiment 1 will be described. The electric storage device is for storing electricity, and it includes a secondary battery and a capacitor. In the present embodiment, an electric storage device having a plurality of battery cells integrated will be described as an example of the electric storage device.

Figure 1:
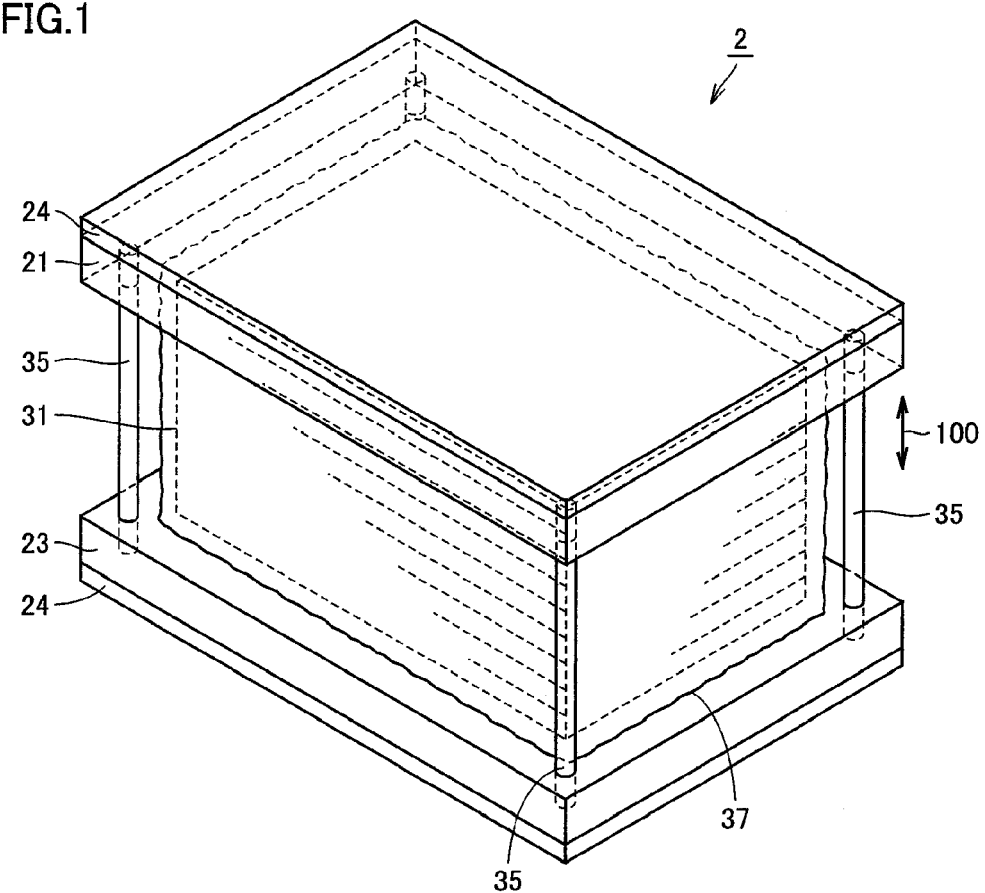
FIG. 1 is a schematic perspective view of an electric storage device in accordance with Embodiment 1.

FIG. 1 is a schematic perspective view of the electric storage device in accordance with the present embodiment. The electric storage device in accordance with the present embodiment is a secondary battery including a plurality of battery cells. The electric storage device in accordance with the present embodiment is a bipolar battery, including a bipolar electrode.

Electric storage device 2 includes a stacked body 31 having a plurality of battery cells stacked together. Arrow 100 indicates direction of stacking of the plurality of battery cells. Electric storage device 2 includes a negative electrode 21 and a positive electrode 23. Stacked body 31 is sandwiched between negative electrode 21 and positive electrode 23. Negative electrode 21 and positive electrode 23 are fixed to each other by a fixing member 35. On the surface of each of negative electrode 21 and positive electrode 23, an insulating film 24 is provided. Insulating film 24 insulates electric storage device 2 from a member on which electric storage device 2 is placed.

Electric storage device 2 is provided with resin 37 arranged around stacked body 31. Resin 37 is positioned between negative electrode 21 and positive electrode 23. Resin 37 is arranged to surround stacked body 31.

Figure 2:
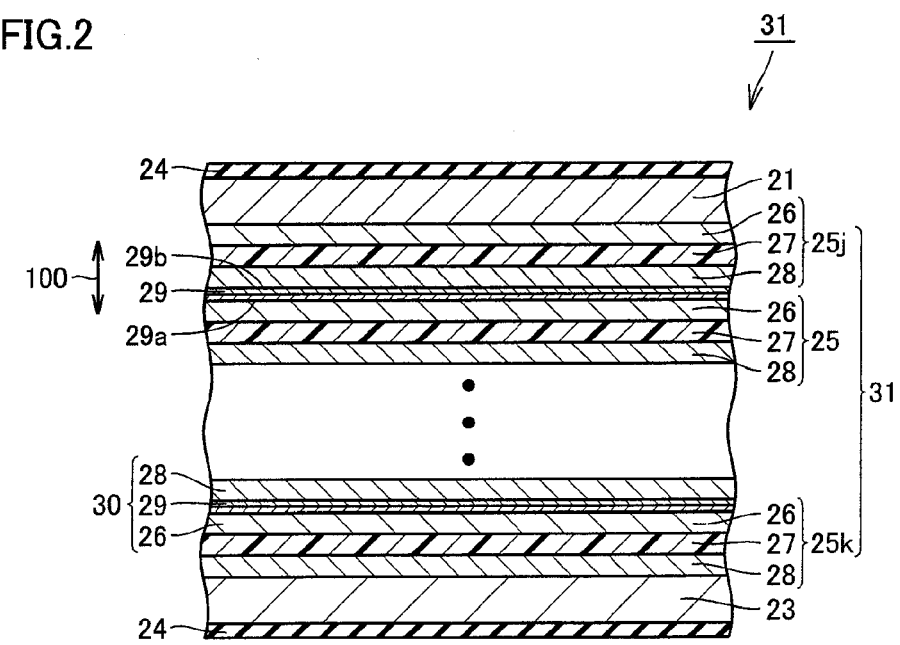
FIG. 2 is a schematic cross-sectional view of the electric storage device in accordance with Embodiment 1.

FIG. 2 is an enlarged schematic cross-sectional view of a portion of a stacked body in accordance with the present embodiment. Stacked body 31 is an integrated body of a plurality of battery cells 25 stacked together. Each battery cell 25 is formed as a plate. Battery cell 25 consists of a cathode active material 28 serving as a cathode, an anode active material 26 serving as an anode, and an electrolyte layer 27 inserted between cathode active material layer 28 and anode active material layer 26.

Electrolyte layer 27 is formed of a material having ion conductivity. Electrolyte layer 27 may be a solid electrolyte or gel electrolyte. Insertion of electrolyte layer 27 makes smooth ion conduction between cathode active material layer 26 and anode active material layer 28, improving output of the battery.

The plurality of battery cells 25 are stacked such that cathode active material layer 28 and anode active material layer 26 oppose to each other at positions where the layers extend next to each other in the stacking direction indicated by arrow 100. Between the plurality of battery cells 25, a collector foil 29 is provided. Collector foil 29 is formed as a plate. Collector foil 29 is in plane-contact with battery cell 25.

Collector foil 29 has its maximum area surface, having the largest area, joined to the active material layer of battery cell 25. Cathode active material layer 28 is formed on one surface 29b of collector foil 29, and anode active material layer 26 is formed on the other surface 29a of collector foil 29. Cathode active material layer 28 and anode active material layer 26 are formed, for example, by sputtering on the surfaces of collector foil 29.

A set of cathode active material layer 28, collector foil 29 and anode active material layer 26 arranged between electrolyte layers 27 adjacent to each other in the stacking direction of battery cells 25 constitute a bipolar electrode 30. In the bipolar battery, both the cathode active material layer 28 serving as the cathode and the anode active material layer 26 serving as the anode are provided on one bipolar electrode 30.

The plurality of battery cells 25 include a battery cell 25j positioned on the side closest to negative electrode 21 and a battery cell 25k positioned on the side closest to positive electrode 23. Battery cell 25j is provided such that anode active material layer 26 is arranged at the end on the side of negative electrode 21. Battery cell 25k is provided such that cathode active material layer 28 is arranged at the end on the side of positive electrode 23. Thus, negative electrode 21 is in contact with anode active material layer 26 of battery cell 25j, and positive electrode 23 is in contact with cathode active material layer 28 of battery cell 25k.

Figure 3:
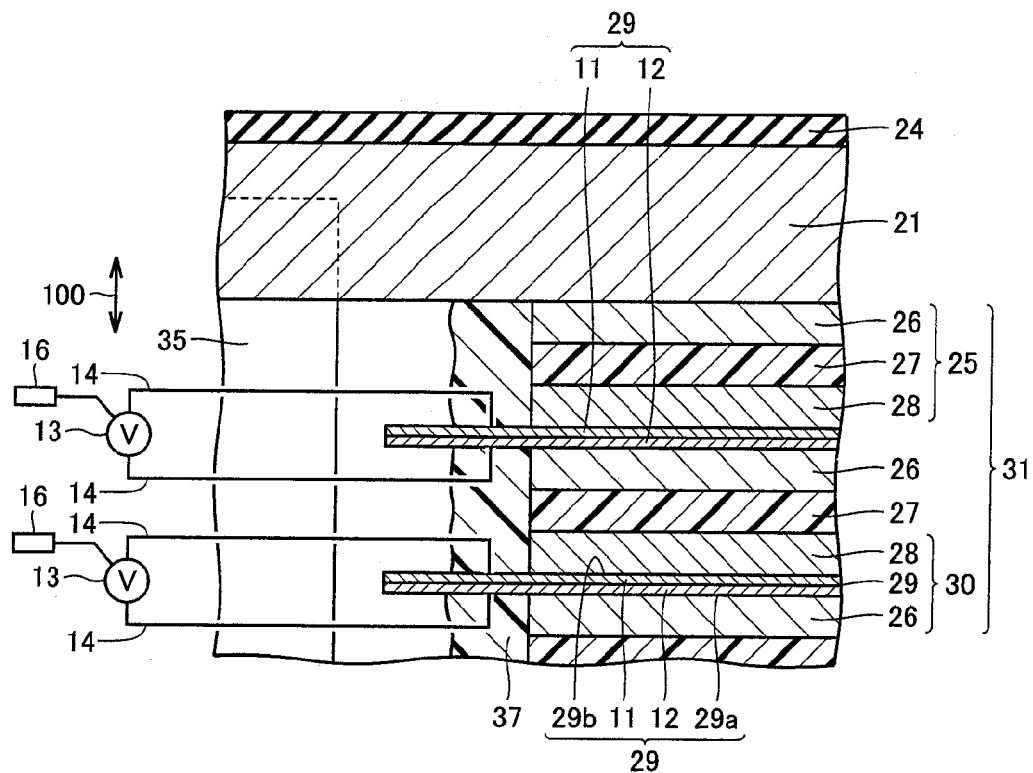
FIG. 3 is an enlarged schematic cross-sectional view of the electric storage device in accordance with Embodiment 1.

FIG. 3 is a schematic cross-sectional view showing an end portion the electric storage device in accordance with the present embodiment. Resin 37 is arranged to seal stacked body 31. Arrangement of resin 37 prevents leakage of electrolyte layer 27. The stacked body of the present embodiment is resin-sealed.

The structure for preventing leakage of electrolyte layer is not limited to resin seal and any form may be adopted. By way of example, stacked body 31 may be covered by a tight-seal type case. In place of resin, packing may be arranged between collector foils 29. If electrolyte layer 27 is formed of a solid electrolyte, provision of resin 37 is unnecessary.

Next, materials forming the bipolar battery will be described in detail. Collector foil 29 in accordance with the present embodiment is a laminated metal plate having metals of different types laminated. Collector foil 29 includes a first metal plate 11 and a second metal plate 12. The second metal plate 12 is formed of a metal different from first metal plate 11. First and second metal plates 11 and 12 of the present embodiment are formed to have approximately the same size. The first and second metal plates 11 and 12 are in plane-contact with each other. In the present embodiment, the first metal plate is copper foil, and second metal plate 12 is aluminum foil.

The first and second metal plates are not limited to those, and what is necessary is that these are of different metals. Further, the first and second metal plates may be clad metal plates. Possible materials of the metal plates include, in addition to copper and aluminum, titanium, nickel, stainless steel (SUS) or an alloy of these.

Cathode active material layer 28 includes a cathode active material layer and a solid polymer electrolyte. Cathode active material layer 28 may contain a supporting electrolyte (lithium salt) for improving ion conductivity, a conduction assistant for improving electron conductivity, NMP (N-methyl-2-pyrolidone) as a solvent for adjusting slurry viscosity, AIBN (azobisisobutyronitrile) as a polymerization initiator or the like.

As the cathode active material, composite oxide of lithium and transition metal generally used in a lithium ion secondary battery may be used. Examples of the cathode active material may include Li/Co based composite oxide such as $LiCoO_2$, Li/Ni based composite oxide such as $LiNiO_2$, Li/Mn based composite oxide such as spinel $LiMn_2O_4$, and Li/Fe based composite material such as $LiFeO_2$. Other examples are sulfated compound or phosphate compound of lithium and transition metal such as $LiFePO_4$; sulfide or oxide of transition metal such as $V_2O_5$, $MnO_2$, $TiS_2$, $MoS_2$ and $MoO_3$; $PbO_2$, AgO, NiOOH and the like.

The solid polymer electrolyte is not specifically limited and it may be any ion-conducting polymer. For example, polyethylene oxide (PEO), polypropylene oxide (PPO) or copolymer of these may be available. Such a polyalkylene oxide based polymer easily dissolves lithium salt such as $LiBF_4$, $LiPF_6$, $LiN(SO_2CF_3)_2$, or $LiN(SO_2C_2F_5)_2$. The solid polymer electrolyte is included in at least one of cathode active material layer 28 and anode active material layer 26. More preferably, the solid polymer electrolyte is included both in cathode active material layer 28 and anode active material layer 26.

As the supporting electrolyte, $Li(C_2F_5SO_2)_2N$, $LiBF_4$, $LiPF_6$, $LiN(SO_2C_2F_5)_2$ or a mixture of these may be used. As the electron conduction assistant, acetylene black, carbon black, graphite or the like may be used.

Anode active material layer 26 includes an anode active material layer and a solid polymer electrolyte. Anode active material layer may contain a supporting electrolyte (lithium salt) for improving ion conductivity, a conduction assistant for improving electron conductivity, NMP (N-methyl-2-pyrolidone) as a solvent for adjusting slurry viscosity, AIBN (azobisisobutyronitrile) as a polymerization initiator or the like.

As the anode active material layer, a material generally used in a lithium ion secondary battery may be used. If a solid electrolyte is used, however, it is preferred to use a composite oxide of carbon or lithium and metal oxide or metal, as the anode active material layer. More preferably, the anode active material layer is formed of a composite oxide of carbon or lithium and transition metal. Further preferably, the transition metal is titanium. Specifically, it is more preferred that the anode active material layer is of a composite oxide of titanium and lithium or a titanium oxide.

As the solid electrolyte forming electrolyte layer 27, by way of example, a solid polymer electrolyte such as polyethylene oxide (PEO), polypropylene oxide (PPO) or copolymer of these may be used. The solid electrolyte contains supporting electrolyte (lithium salt) for ensuring ion conductivity. As the supporting salt, $LiBF_4$, $LiPF_6$, $LiN(SO_2CF_3)_2$, $LiN(O_2C_2F_5)_2$ or a mixture of these may be used.

Specific examples of materials for cathode active material layer 28, anode active material layer 26 and electrolyte layer 27 are listed in Tables 1 to 3. Table 1 shows specific examples when electrolyte layer 27 is of an organic solid electrolyte, Table 2 shows specific examples when electrolyte layer 27 is of an inorganic solid electrolyte, and Table 3 shows specific examples when electrolyte layer 27 is of a gel electrolyte.

TABLE 1

| Cathode material | Anode material | Solid electrolyte | Remarks |
|---|---|---|---|
| $LiMn_2O_4$ | Li metal | P(EO/MEEGE) | electrolyte salt: $LiBF_4$ |
| — | Li metal | P(EO/PEG-22) | electrolyte salt: $LiN(CF_3SO_2)_2$(LiTFSI) |
| $LiCoO_2$ | carbon | PVd base | — |
| $LiCoO_2$ | Li metal | ether based polymer P(EO/EM/AGE) | electrolyte salt: LiTFSI<br>ion conducting material binder: mix P(EO/EM) + $LiBF_4$ to cathode |
| $Li_{0.33}MnO_2$ | Li metal | P(EO/EM/AGE) | electrolyte salt: LiTFSI<br>ion conducting material binder: mix PEO-based solid polymer + LiTFSI to cathode |
| $Li_{0.33}MnO_2$ | Li metal | PEO base + inorganic additive | electrolyte salt: $LiClO_4$<br>ion conducting material: mix KB + PEG + LiTFSI to cathode |
| — | — | PEG-PMMA + PEG-borate ester | electrolyte salt: LiTFSI, BGBLi |
| — | — | PEO base + 10 mass %$0.6Li_2S + 0.4SiS_2$ | electrolyte salt: $LiCF_3SO_3$ |
| — | Li metal | PEO base + perovskite type $La_{0.55}Li_{0.35}TiO_3$ | electrolyte salt: $LiCF_3SO_3$ |
| Li metal | — | styrene/ethylene oxide-block-graft polymer(PSEO) | electrolyte salt: LiTFSI<br>ion conducting material: mix KB + PVdF + PEG + LiTFSI to cathode |
| $LiCoO_2$ | Li metal | P(DMS/EO) + polyether cross link | — |
| $Li_{0.33}MnO_2$ | Li metal | prepolymer composition mainly consisting of urethane acrylate (PUA) | electrolyte salt: LiTFSI<br>ion conducting material: mix KB + PVdF + PEG + LiTFSI to cathode |
| — | — | multibranched graft polymer (MMA + CMA + POEM) | electrolyte salt: $LiClO_4$ |
| $LiNi_{0.8}Co_{0.2}O_2$ | Li metal | PEO/multibranched polymer/filler based composite solid electrolyte (PEO + HBP + $BaTiO_3$) | electrolyte salt: LiTFSI<br>mix SPE + AB to cathode |
| — | — | PME400 + 13fgroup metal alkoxide (as Lewis acid) | electrolyte salt: LiCl |
| — | — | matrix containing poly (N-methylvinylimidazoline) (PNMVI) | electrolyte salt: $LiClO_4$ |
| $LiCoO_2$ | Li metal | polymerize methoxy polyethylene glycol monomethyl meso acrylate using ruthenium complex by living radical polymerization, further polymerize with styrene | electrolyte salt: $LiClO_4$<br>cathode conducting material KB + binder PVdF |
| $LiCoO_2$ | Li metal | P(EO/EM) + ether based plasticizer | electrolyte salt: LiTFSI<br>cathode conducting material KB + binder PVdF |

TABLE 2

| Cathode material | Anode material | Solid Electrolyte | Remarks |
|---|---|---|---|
| $LiCoO_2$ | In | $95(0.6Li_2S \cdot 0.4SiS_2) \cdot 5Li_4SiO_4$<br>($Li_2S$—$SiS_2$ based melt rapid cooled glass) | state: glass |
| — | — | $70Li_2S \cdot 30P_2S_5$ $Li_{1.4}P_{0.6}S_{2.2}$ sulfide glass<br>($Li_2S$—$P_2S_5$ based glass ceramics) | state: glass<br>forming method: mechanochemical |
| — | — | $Li_{0.35}La_{0.55}TiO_3$(LLT)<br>(perovskite type structure) | state: ceramics<br>form solid electrolyte porous body, fill pores with active material sol |
| — | — | $80Li_2S \cdot 20P_2S_5$<br>($Li_2S$—$P_2S_5$ based glass ceramics) | state: glass<br>forming method: mechanochemical |
| — | — | $xSrTiO_3 \cdot (1-x)LiTaO_3$<br>(perovskite type oxide) | state: ceramics |
| $LiCoO_2$ | Li—In metal | $Li_{3.4}Si_{0.4}P_{0.6}S_4$<br>(thio-LISICON Li ion conductor) | state: ceramics |
| — | — | $(Li_{0.1}La_{0.3})_xZr_yNb_{1-y}O_3$<br>(perovskite type oxide) | state: ceramics |
| — | — | $Li_4B_7O_{12}Cl$ | state: ceramics<br>combine PEG as organic compound |
| — | — | $Li_4GeS_4$—$Li_3PS_4$ based crystal $Li_{3.25}Ge_{0.25}P_{0.75}S_4$<br>(thio-LISICON Li ion conductor) | state: ceramics |
| — | Li metal | $0.01Li_3PO_4$—$0.63Li_2S$—$0.36SiS_2$ | state: ceramics |
| — | In metal | (thio-LISICON Li ion conductor) | |
| $LiCoO_2$ $LiFePO_4$ | Li metal | $Li_3PO_{4-x}N_x$(LIPON) | state: glass |
| $LiMn_{0.6}Fe_{0.4}PO_4$ | $V_2O_5$ | (lithium phosphate oxinitride glass) | |

TABLE 2-continued

| Cathode material | Anode material | Solid Electrolyte | Remarks |
|---|---|---|---|
| $LiNi_{0.8}Co_{0.15}Al_{0.05}O_2$ | Li metal | $Li_3InBr_3Cl_3$ (rock salt type Li ion conductor) | state: ceramics |
| — | — | $70Li_2S\bullet(30-x)P_2S_5\bullet xP_2O_5$ ($Li_2S$—$P_2S_5$—$P_2O_5$ based glass ceramics) | state: glass |
| $LiCoO_2$ etc. | Li metal Sn based oxide | $Li_2O$—$B_2O_3$—$P_2O_5$ base, $Li_2O$—$V_2O_5$—$SiO_2$ base, $Li_2O$—$TiO_2$—$P_2O_5$ base, LVSO etc. | state: glass |
| — | — | $LiTi_2(PO_3)_4$ (LTP) (NASICON type structure) | state: ceramics |

TABLE 3

| Cathode material | Anode material | Polymer base | Remarks |
|---|---|---|---|
| Ni based collector | Li metal | acrylonitrile vinyl acetate (PAN-VAc based gel electrolyte) | solvent: EC + PC<br>electrolyte salt: $LiBF_4$, $LiPF_6$, $LiN(CF_3SO_2)_2$ |
| lithium electrode | lithium electrode | triethylene glycolmethyl methacrylate (polymethyl methacrylate[ (PMMA) based gel electrolyte) | solvent: EC + PC<br>electrolyte salt: $LiBF_4$ |
| $V_2O_5$/PPy composite body | Li metal | methyl methacrylate (PMMA gel electrolyte) | solvent: EC + DEC<br>electrolyte salt: $LiClO_4$ |
| Li metal | Li metal | PEO/PS polymer blend gel electrolyte | solvent: EC + PC<br>electrolyte salt: $LiClO_4$ |
| Li metal | Li metal | alkylene oxide based polymer electrolyte | solvent: PC<br>electrolyte salt: $LiClO_4$ |
| Li metal & $LiCoO_2$ | Li metal | alkylene oxide based polymer electrolyte | solvent: EC + GBL<br>electrolyte salt: $LiBF_4$ |
| Li metal | Li metal | polyolefin based base polymer | solvent: EC + PC<br>electrolyte salt: $LiBF_4$ |
| $Li_{0.36}CoO_2$ | Li metal | polyvinylidenefluoride (PVdF) + propylene hexafluoride (HFP) (PVdF-HFP gel electrolyte) | solvent: EC + DMC<br>electrolyte salt: $LiN(CF_3SO_2)_2$ |
| $LiCoO_2$ | Li metal | PEO based and aclyl based polymer | solvent: EC + PC<br>electrolyte salt: $LiBF_4$ |
| Li metal | Li metal | trimethylol propane ethoxylate acrylate (ether based polymer) | solvent: PC<br>electrolyte salt: LiBETI, $LiBF_4$, $LiPF_6$ |
| — | — | EO-PO copolymer | electrolyte salt: LiTFSI, $LiBF_4$, $LiPF_6$ |
| — | — | poly aziridine compound | solvent: EC + DEC<br>electrolyte salt: $LIPF_6$ |
| — | PAS (polyacene) | PVdF-HFP gel electrolyte | solvent: PC, EC + DEC<br>electrolyte salt: $LiClO_4$, $Li(C_2F_5SO_2)_2N$ |
| — | — | urea based lithium polymer gel electrolyte | solvent: EC + DMC<br>electrolyte salt: $LiPF_6$ |
| — | — | polyether/polyurethane based (PEO-NCO) gel electrolyte | solvent: PC<br>electrolyte salt: $LiClO_4$ |
| — | — | cross-linked polyalkylene oxide based gel polymer electrolyte | — |

Referring to FIG. 3, electric storage device 2 in accordance with the present embodiment includes a potential difference measuring means for measuring potential difference between the first and second metal plates 11 and 12, and the potential difference measuring means includes a voltmeter 13. Voltmeter 13 is electrically connected to the first and second metal plates 11 and 12. Potential difference measuring means includes leads 14. The first and second metal plates 11 and 12 are respectively connected by leads 14 to voltmeter 13. Lead 14 is connected to an end portion of first metal plate 11. Lead 14 is also connected to an end portion of the second metal plate 12. Leads 14 are connected to the first and second metal plates 11 and 12 at a region outside of stacked body 31.

Respective leads 14 are connected to the first and second metal plates 11 and 12 in the region where resin 37 is arranged. Voltmeter 13 is formed to measure potential difference (voltage) generated between different types of metal, utilizing Seebeck effect.

The electric storage device in accordance with the present embodiment includes a temperature detector 16 as temperature detecting means for detecting temperature based on the potential difference measured by voltmeter 13. Temperature detector 16 is formed to detect temperature of collector foil 29 based on correlation between the temperature and the potential difference generated between different types of metal verified in advance.

Temperature detector 16 in accordance with the present embodiment has a function of correcting detected temperature based on the correlation between the temperature detected from potential difference generated between the first and second metal plates 11 and 12 and the temperature in stacked body 31. Temperature detector 16 of the present embodiment is formed such that the temperature approximately at the center of collector foil 29 of stacked body 31 when viewed two-dimensionally can be detected. Namely, temperature detector 16 is formed to allow detection of the temperature inside the stacked body 31.

During normal charge/discharge, potential difference detected from each collector foil 29 is within a prescribed range. Considering this range of potential difference to be a reference range of potential difference, the potential difference detected from collector foil 29 goes out of this range if any abnormality occurs in the electric storage device. By measuring the potential difference detected from collector foil 29, abnormality of the electric storage device can be detected. By way of example, defective connection of storage cells or short-circuit of electric circuitry can be detected.

Further, in the present embodiment, the temperature inside the stacked body can be detected from the measured potential difference and, therefore, abnormality of the stacked body temperature can be detected. Further, as the leads are connected to end portions of the first and second metal plates, the inner temperature of the stacked body can be measured with a simple structure, without necessitating insertion of any component to the inside of stacked body. For instance, it is unnecessary to insert a temperature measuring device such as a thermocouple to the inside of stacked body, to measure the inner temperature of the stacked body.

The electric storage device in accordance with the present embodiment can measure the potential difference between the first and second metal plates 11 and 12 without affecting chemical reaction in battery cells 25. Thus, the temperature inside the electric storage device can be measured without affecting the chemical reaction in battery cells 25.

For instance, if a temperature measuring device such as a thermocouple is inserted to the inside of the stacked body of battery cells, it affects chemical reaction in the battery cells. In the present embodiment, any member for measuring temperature is not inserted to the inside of the stacked body of battery cells and, therefore, the temperature inside the stacked body can be measured without affecting the battery cells.

The electric storage device in accordance with the present embodiment includes a controller controlling charge/discharge in case of abnormality. By way of example, the controller is adapted to suppress charge/discharge if the temperature inside the stacked body 31 exceeds the reference range of potential difference, or adapted to electrically separate the electric storage device from an electric circuitry connected to the electric storage device if the inside of stacked body 31 is at a high temperature.

In the present embodiment, voltmeter 13 is connected to each collector foil 29. Voltmeter 13 is connected to each of the plurality of collector foils 29. By this structure, it becomes possible to individually measure the temperature of each collector foil and, therefore, it is possible to identify the abnormal battery cell.

Further, as the voltmeter is connected to each battery cell, abnormality in a small part can be detected and, therefore, abnormality of the electric storage device as a whole can be detected at an early stage. When abnormality of a battery cell is found among the plurality of battery cells, it may be considered that the electric storage device as a whole has abnormality.

The electric storage device in accordance with the present embodiment includes a collector plate arranged to be in plane-contact with the battery cell, and the collector plate includes a laminated metal plate. This structure provides the collector plate with the function of detecting abnormality, or the structure can be simplified.

The electric storage device in accordance with the present embodiment includes the stacked body having a plurality of battery cells stacked together. This structure allows increase in the capacity of electric storage device or increase in the output voltage.

Figure 4:
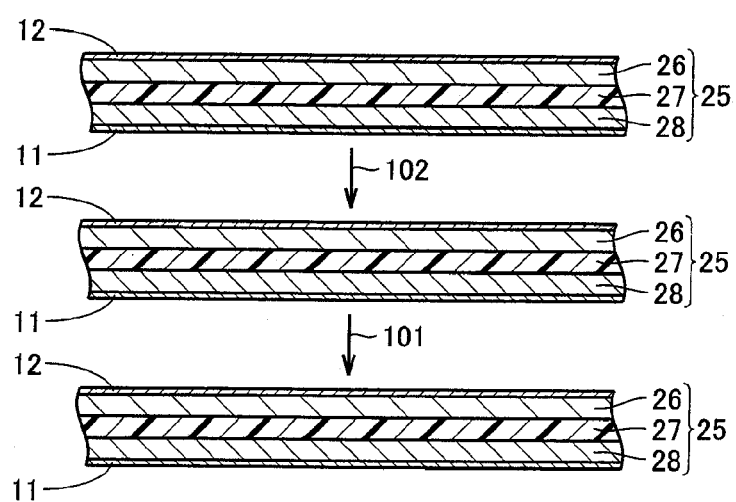
FIG. 4 is a schematic cross-sectional view showing a method of manufacturing the electric storage device in accordance with Embodiment 1.

FIG. 4 is a schematic cross-sectional view showing a method of manufacturing the electric storage device in accordance with the present embodiment. The method of manufacturing the electric storage device in accordance with the present embodiment includes the step of manufacturing a unit cell having the first and second metal plates 11 and 12 positioned on opposite sides of battery cell 25, and the step of stacking such unit cells.

In the method of manufacturing the electric storage device in accordance with the present embodiment, battery cells 25 each having the first and second metal plates 11 and 12 positioned on the surfaces are joined to each other as indicated by arrows 101 and 102. The first metal plate 11 positioned on the surface of one battery cell 25 is joined to the second metal plate 12 positioned on another battery cell.

In this manner, in the present embodiment, it is unnecessary to stack the electrolyte layer, active material layer and collector foil one after another in order, but unit cells each including a battery cell are manufactured and the unit cells may be stacked afterwards for manufacturing. Therefore, the steps of manufacturing the stacked type battery can be simplified, realizing easy manufacturing. Further, if a defective connection of a lead should be found in a test after manufacturing the stacked body of battery cells, it can easily be repaired and, hence, production yield can be improved.

Though the electric storage cell of the present embodiment includes a battery cell, it is not limiting and the electric storage cell may include a capacitor. A plurality of capacitors may be stacked as a single stacked body.

Further, in the stacked body in accordance with the present embodiment, a plurality of battery cells are stacked to face one side. The arrangement is not limited thereto, and any method of stacking may be adopted. For instance, the stack may include battery cells facing opposite sides, to realize parallel connection of battery cells.

Embodiment 2

Figure 5:
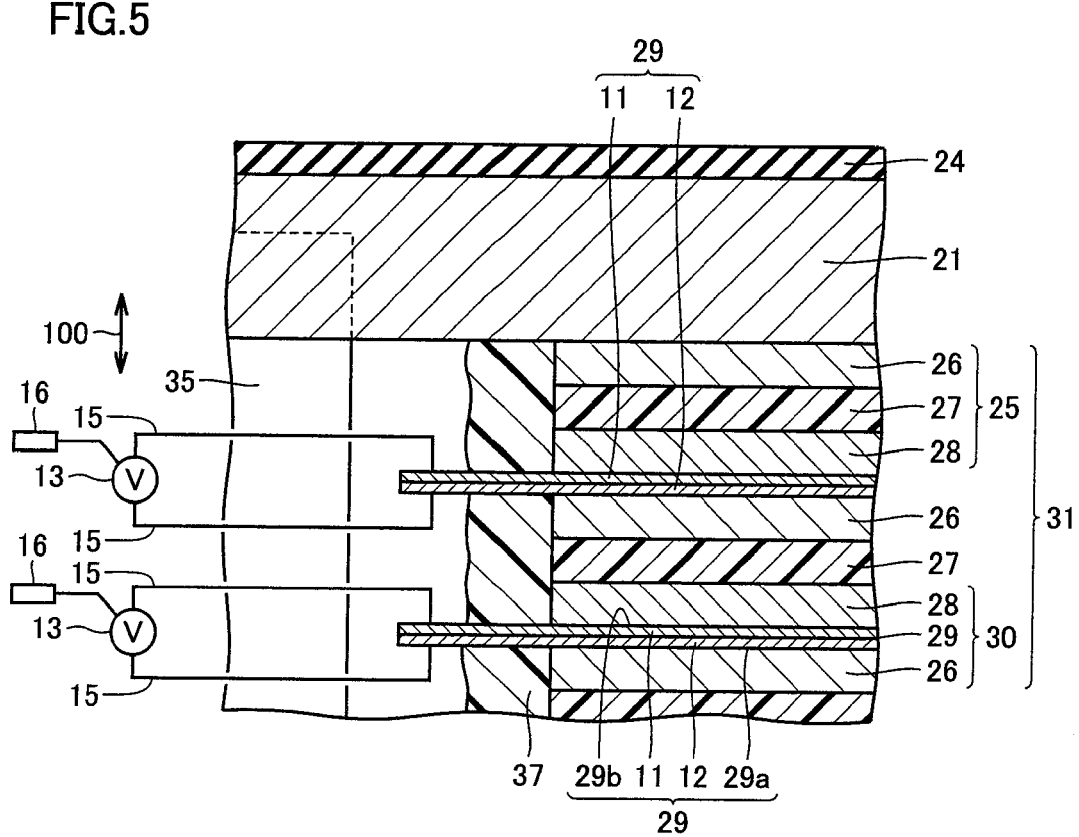
FIG. 5 is an enlarged schematic cross-sectional view of an electric storage device in accordance with Embodiment 2.

Referring to FIG. 5, the electric storage device in accordance with Embodiment 2 will be described.

FIG. 5 is a schematic cross-sectional view of an end portion of the electric storage device in accordance with the present embodiment. In the present embodiment, the potential difference measuring means for measuring potential difference between the first and second metal plates 11 and 12 includes a voltmeter 13. Potential difference measuring means includes leads 15. The first and second metal plates 11 and 12 are connected by leads 15 to voltmeter 13. The electric storage device in accordance with the present embodiment includes a temperature detector 16 as temperature detecting means for detecting temperature based on the potential difference measured by voltmeter 13.

Leads 15 are connected to end portions of the first and second metal plates 11 and 12, respectively. In the present embodiment, leads 15 are connected in a region outside of the stacked body of battery cells 25. Further, leads 15 are connected outside of the region where resin 37 is arranged.

In the electric storage device in accordance with the present embodiment, it is possible to connect leads 15 to end portions of the first and second metal plates 11 and 12 after the battery cells 25 are stacked, enabling easier manufacturing. Further, as lead 15 is connected to the region outside of resin 37, connection of lead 15 is possible after solidifying stacked body 31 with resin 37, enabling easier manufacturing.

In the electric storage device in accordance with the present embodiment, if a defective connection of lead 15 should be found in a test after manufacturing the electric storage device, it can easily be repaired and, hence, production yield can be improved.

Other structures, functions and effects are the same as those of Embodiment 1 and, therefore, description thereof will not be repeated.

According to the present invention, an electric storage device allowing detection of any abnormality with a simple structure can be provided.

In the figures, the same or corresponding portions are denoted by the same reference characters.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

Industrial Applicability

The present invention is advantageously applicable to an electric storage device for storing electricity.

The invention claimed is:

1. An electric storage device, comprising:
an electric storage cell including a stacked body;
a laminated metal plate having a first metal plate and a second metal plate laminated together so that a surface of the first metal plate is in contact with a surface of the second metal plate, and at least one end portion of each of the first and second plates extends out of the stacked body; and
a potential difference measuring device for measuring potential difference between said first metal plate and said second metal plate outside of the stacked body; wherein said first metal plate and said second metal plate are formed of mutually different metals; and
said laminated metal plate is arranged to be in contact with said electric storage cell.

2. The electric storage device according to claim 1, comprising a collector plate arranged to be in direct contact with a surface of said electric storage cell; wherein
said collector plate includes said laminated metal plate.

3. The electric storage device according to claim 1, wherein the stacked body includes a stack of a plurality of said electric storage cells.

4. The electric storage device according to claim 1, wherein said potential difference measuring device includes leads connected to the at least one end portion of said first metal plate and the at least one end portion of said second metal plate, respectively; and
a voltmeter connected to said leads for measuring said potential difference.

5. The electric storage device according to claim 1, wherein said electric storage cell includes a battery cell.

6. The electric storage device according to claim 1, comprising a temperature detecting device to detect temperature based on said potential difference.

* * * * *